United States Patent
Locascio et al.

(10) Patent No.: US 7,031,752 B1
(45) Date of Patent: Apr. 18, 2006

(54) MEDIA RESOURCE CARD WITH PROGRAMMABLE CACHING FOR CONVERGED SERVICES PLATFORM

(75) Inventors: Timothy Ray Locascio, Osterville, MA (US); James Thomas DellaMorte, Sr., West Barnstable, MA (US); Rajnish Jain, West Yarmouth, MA (US); John R. DeCesare, Sandwich, MA (US); Gary Baldino, Milford, CT (US)

(73) Assignee: Excel Switching Corporation, Hyannis, MA (US)

( * ) Notice: Subject to any disclaimer, the term of this patent is extended or adjusted under 35 U.S.C. 154(b) by 223 days.

(21) Appl. No.: 10/693,625

(22) Filed: Oct. 24, 2003

(51) Int. Cl.
*H04M 1/00* (2006.01)

(52) U.S. Cl. .................. 455/560; 455/561; 455/418; 379/202.01; 379/201.03; 370/442; 370/362

(58) Field of Classification Search ............. 455/418, 455/560, 561; 379/202.01, 201.03; 370/442, 370/362

See application file for complete search history.

(56) References Cited

U.S. PATENT DOCUMENTS

| | | | |
|---|---|---|---|
| 6,879,266 B1 * | 4/2005 | Dye et al. | 341/51 |
| 6,888,925 B1 | 5/2005 | Spitzer et al. | |
| 6,952,407 B1 | 10/2005 | Burke | |
| 2002/0016899 A1 * | 2/2002 | West et al. | 711/206 |
| 2002/0154646 A1 * | 10/2002 | Dubois et al. | 370/406 |
| 2003/0009343 A1 | 1/2003 | Spitzer | |
| 2003/0051101 A1 | 3/2003 | Burger et al. | |
| 2003/0053461 A1 | 3/2003 | Ross | |
| 2003/0219029 A1 * | 11/2003 | Pickett | 370/442 |
| 2004/0174973 A1 * | 9/2004 | O'Malley et al. | 379/202.01 |

\* cited by examiner

*Primary Examiner*—Danh Cong Le
(74) *Attorney, Agent, or Firm*—Cesari & McKenna LLP

(57) ABSTRACT

A media resources card for use with a converged services platform. The media resources card, which includes one or more arrays of digital signal processors (DSPs), s operable to perform a variety of communication services including recording and playback of voice recorded announcements. A caching arrangement is provided in which a given recording (file) may have either a persistence level or timer expiration attribute or both.

20 Claims, 2 Drawing Sheets

US 7,031,752 B1

MEDIA RESOURCE CARD WITH PROGRAMMABLE CACHING FOR CONVERGED SERVICES PLATFORM

BACKGROUND OF THE INVENTION

1. Field of the Invention

The present inventions relates generally to the field of telecommunications and, more specifically, to a media resource card which may be used, in conjunction with a converged services platform, to provide a wide variety of enhanced communications services.

2. Background Information

A continuing trend of convergence between the circuit-switched public switched telephone network (PSTN) and packet-switched networks, such as Internet Protocol (IP) networks, has created demand for systems capable of interfacing with both types of networks while supporting a large number of diverse applications. Such applications include toll-free calling, wireless/wireline prepaid calling, directory assistance, voicemail, call centers, conferencing and many others. In order to support such diverse applications, it is generally necessary to provide a capability for performing DTMF tone generation/detection, voice recorded announcements and similar communications services. Such basic capability, conventionally packaged as a "card" or printed circuit board which interfaces with an industry standard bus, has been commercially available for some time from a variety of vendors including Intel Corporation and NMS Communications.

However, marketplace demands indicate that greater scalability, density, smaller packaging and greater performance/cost ratios are needed in order for telecommunication carriers and other service providers to operate profitably and to be in position to rapidly deploy new applications which represent new revenue sources. As a result, there is need for greater flexibility and programmability in delivering the communications services which enable the applications.

SUMMARY OF THE INVENTION

In brief summary, the present invention provides a media resource card which, when integrated into a converged services platform, is operable to perform a variety of enhanced telecommunication services. Such services include tone detection/tone generation, conferencing, recording and playback, and numerous others.

In a preferred embodiment, the media resource card includes a plurality of digital signal processors (DSPs), each of which has an associated cache memory, and a communications interface to the main microprocessor. The main microprocessor supports a network interface through which the media resource card may communicate with a networked media (file) server. In accordance with one aspect of the present invention, a file may be retrieved from the media server or other source and cached in one or more cache memories. The cached file preferably has at least two programmable attributes associated with it: a persistence level and an expiration time. The persistence level attribute may be used to specify how readily or not a particular file may be deleted from the cache. The expiration time attribute may be used to specify a time period after which a particular file may be deleted from the cache.

In a preferred embodiment, both attributes are programmable by way of an application program. That is, an application program may set one or both attributes on a per file basis, thus permitting an application developer to optimize cache performance for a given application.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
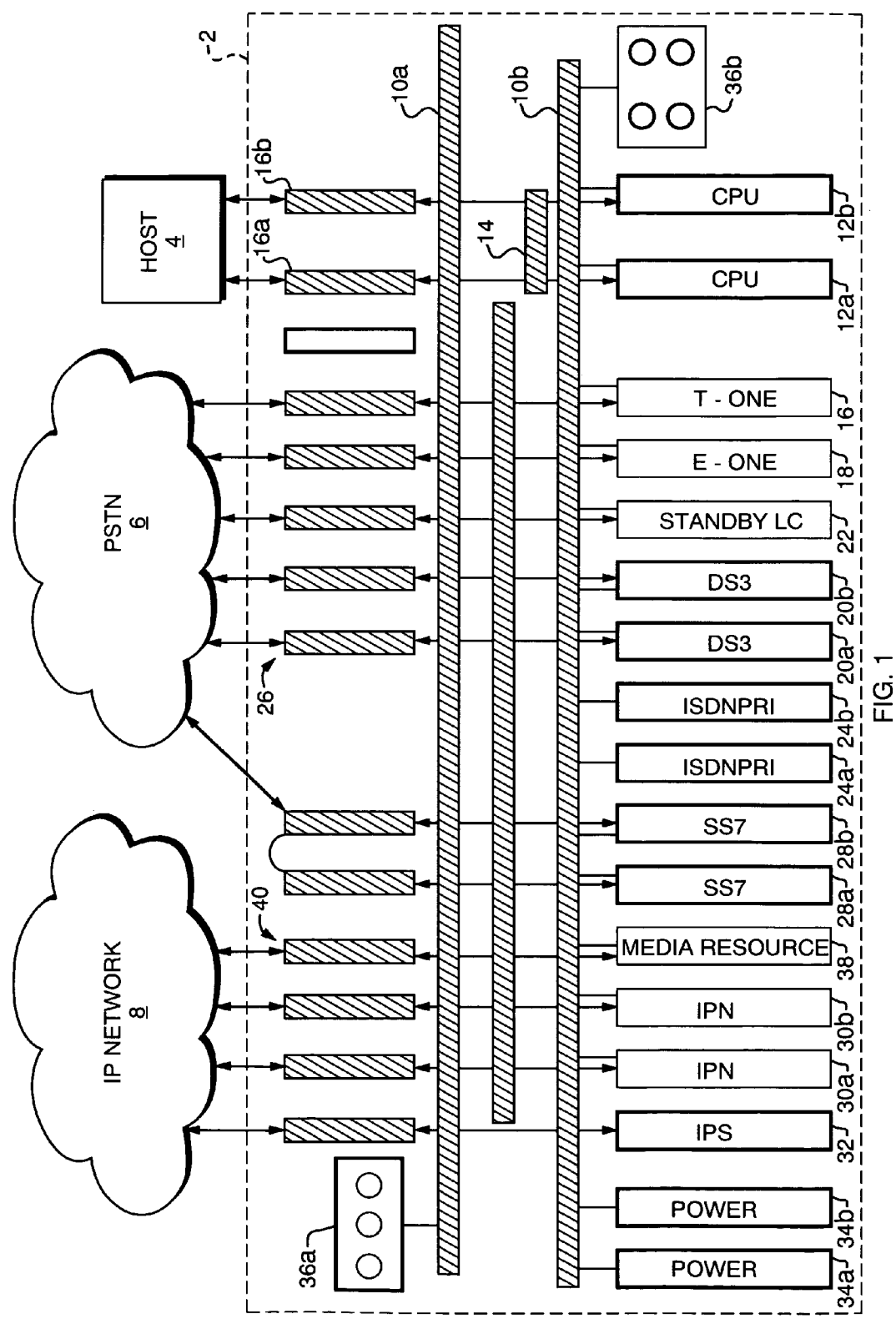
FIG. 1 is a block diagram of a converged services platform which includes a media resource card constructed in accordance with a preferred embodiment of the present invention.

FIG. 1 shows a converged services platform 2 which is controlled by an application program (not shown) running on a host computer 4. Hardware and software which may be used to implement a converged services platform of the type shown are available from Excel Switching Corporation of Hyannis, Mass. With the inclusion of appropriate cards discussed below, platform 2 is capable of interfacing with both the PSTN 6 and an IP network 8.

As shown, platform 2 includes redundant switching buses 10a and 10b. Redundant CPU cards 12a, 12b are connected to buses 10a, an HDLC bus 14, and to host 4 by way of input/output (I/O) cards 16a, 16b. Depending upon the requirements of a particular application, various combinations of the following "line" cards, each of which supports a particular digital telecommunications protocol, may be included within platform 2: T1 card 16; E1 card 18, DS3 cards 20a, 20b. For redundancy, a standby card 22, which is a duplicate of one of the other line cards, may also be included. All such line cards have an associated I/O card, denoted collectively by reference number 26, which serves as an interface to PSTN 6.

If a particular application requires ISDN signaling, ISDN PRI cards 24a, 24b may be included within platform 2. Similarly, if a particular application requires SS7 signaling, SS7 cards 28a, 28b may be included. If a particular application requires IP media transport, platform 2 may include IPN cards 30a, 30b or an IPS card 32. Also, if a particular application requires media services, a media resource card 38 may be included. Cards 30, 32 and 38 each have an associated I/O card, denoted collectively by reference number 40. Power cards 34a, 34b and cooling fans 36a, 36b are also present within platform 2.

Figure 2:
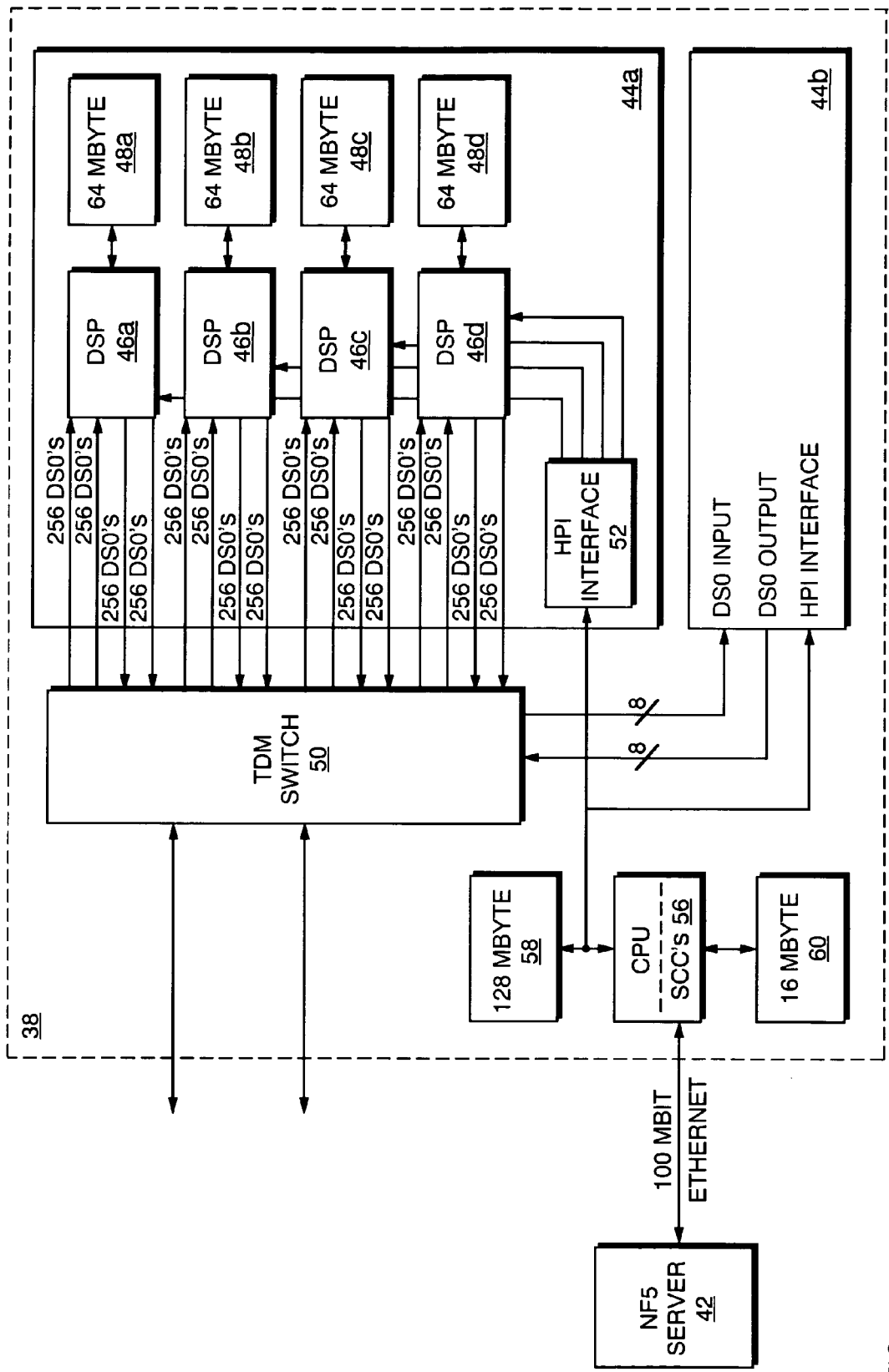
FIG. 2 is a block diagram of the media resource card shown in FIG. 1.

Referring now to FIG. 2, a detailed block diagram of the media resources card 38 is shown. A DSP module 44a includes four DSPs 46a–46d, each of which has an associated cache memory 48a–48d, respectively. Each of DSPs 46a–46d is preferably a Texas Instruments TMS320C6414, but any of a number of other commercially available DSPs could readily be adapted for use with the present invention.

DSPs 46a–46d are connected to a time division multiplex (TDM) switch 50. Each of DSPs 46a–46d is capable of receiving and transmitting up to 512 DS0s (time-slots) from TDM switch 50. If desired, a second DSP module 44b, containing an additional four DSPs (not shown) may added to media resources card.

Overall control of the operation of media resources card 38 is carried out by a CPU 56, which is preferably a Motorola PowerQUICC 8260 processor, having an associated cache memory 58 and a local memory 60. CPU 56 also has an associated Ethernet network interface through which the CPU may communicate with a Network File System (NFS) file server 42. Any of a number of other commercially available microprocessors or other file system protocols, including CIFS or TFTP, could readily be adapted for use with the present invention.

Cache memories 48a–48d and 58 are preferably used to cache voice recorded announcements or other recordings which are intended for playback to callers (not shown) as directed by an application running on host computer 4 (FIG. 1). Large quantities of such voice recorded announcements may be stored on file server 42, in accordance with NFS, CIFS or another desired file system protocol, retrieved by CPU 56 and then cached at the time of initial playback.

We will now describe the operation of a preferred embodiment of a caching algorithm, preferably executed by CPU 56, which may be considered an adjunct to a conventional Least Recently Used (LRU) algorithm (ie., a file which is least recently used is normally the first candidate to be deleted from the cache memory). We shall consider as a first example the case of a "cache miss" in which a file needed for playback is not present in any of the cache memories 48a–48d or 58. First, CPU 56 must retrieve (read) the file from file server 42. Assuming that the file does not exceed a predetermined size, CPU 56 will cache the retrieved file in both cache memory 58 and the one of cache memories 46a–46d which is associated with the DSP that CPU 56 has assigned to initially playback the file. The assignment of DSPs by CPU 56 may be done in any of a number of ways including a "round robin" approach.

An advantage of caching the file in the CPU cache memory 58 is that, in the event the same file is needed for playback in the future, but playback is to be performed by a different DSP than the one that performed the initial playback, the file may be retrieved from cache memory 58 (thus avoiding another file server access) and cached in the appropriate DSP cache memory.

Contemporaneously with beginning playback of the file, either of two (or both) attributes are assigned to the file by CPU 56 in response to messages received the application running on the host computer 4. The first such attribute, referred to as a persistence level, is a value which specifies how readily or not the associated cached file may be deleted from one or more of said cache memories. In a preferred embodiment, one of four possible persistence levels is specified: none; soft; firm; and hard. A persistence level of "none" means that the cached file is transient and may be freely deleted to make room for other files. A "soft" persistence level means that the cached file should remain in the cache memory until the LRU algorithm deletes it. A "firm" persistence level means that the cached file should remain in the cache memory until all of the "soft" persistence level files have been removed by the LRU algorithm. A "hard" persistence level means that the cached file should not be deleted from the cache memory.

As noted above, persistence levels are preferably specified by an application program and are thus under the control of the application developer who, given his or her knowledge of the application's expected performance, can choose persistence levels to optimize cache performance. One exception to this arrangement is the case of a cached recording (e.g., a voicemail message or a directory assistance call) made by the media resources card 38. Because a cached recording is "one of a kind" and is initially not stored anywhere except in one of the cache memories 48a–48d, CPU 56 will assign a "hard" persistence level to such a file to ensure that it is not deleted from the cache memory before being stored elsewhere or there is certainty it is no longer needed.

The second such attribute is a timer expiration, which simply represents a time period after which a cached file may be deleted. If set, the timer expiration attribute may override the persistence level attribute.

We will now consider a second example in which we have a "cache hit" meaning that a file that is needed for playback is present in at least one of cache memories 48a–48d and 58. In this example, CPU 56 will assign one of DSPs 46a–46d to perform the playback. If the cache memory associated with the assigned DSP contains the needed file, the assigned DSP may proceed with playback. If the needed file is contained in the cache memory associated with a different DSP or cache memory 58, then file will be cached to the assigned DSP's cache memory contemporaneously with playback.

What is claimed is:

1. In a converged services platform, a media resources card comprising:

a central processing unit (CPU) and an associated CPU cache memory;

a plurality of digital signal processors (DSPs), each of which has an associated DSP cache memory, coupled in communicating relationship with said CPU; and a network interface, coupled in communicating relationship with said CPU, through which said media resources card may communicate with a file server;

wherein said CPU and DSPs execute a caching algorithm in which a cached file may be assigned at least one of a persistence level attribute and a timer expiration attribute, wherein said persistence level attribute includes programming for specifying how readily or not said cached file may be deleted from one or more of said cache memories in relation to a number of remaining cached files of other persistence levels.

2. The media resources card as in claim 1, wherein said persistence level may be assigned a value of "hard" denoting that said cached file is not to be removed from said cache memories, regardless of the number of remaining cached files of other persistence levels.

3. The media resources card as in claim 1, wherein said persistence level may be assigned a value of "hard" denoting that said cached file is a cached recording file, not to be removed from cache until said cached file is stored to a non-volatile storage medium regardless of the number of remaining cached files of other persistence levels.

4. The media resources card as in claim 1, wherein said persistence level may be assigned a value of "none" denoting that said cached file is to be removed from said cache memories for any reason.

5. The media resources card as in claim 4, wherein said persistence level may be assigned a value of "soft" denoting that said cached file is to remain in said cache memories until after substantially all "none" cached files have been removed, said "soft" cached files being removed then by a Least Recently Used (LRU) algorithm.

6. The media resources card as in claim 5, wherein said persistence level may be assigned a value of "firm" denoting that said cached file is to remain in said cache memories until after substantially all "soft" cached files have been removed, said "firm" cached files also being removed then by an LRU algorithm.

7. The converged services platform as in claim 1, wherein said timer expiration attribute includes programming for specifying a time period after which said cached file may be deleted from one or more of said cache memories.

8. The media resources card as in claim 1, wherein said timer expiration attribute overrides said persistence level attribute.

9. The media resources card as in claim 1, further comprising: an application program for setting said timer expiration attribute and said persistence level attribute of said cached files on a per file basis.

10. A method for use in a converged services platform having a central processing unit (CPU) and a plurality of digital signal processors (DSPs), one of said DSPs being assigned for playback of a requested file, said method comprising the steps of:
   executing a caching algorithm for said requested file, said caching algorithm resulting in a cached file stored on a cache memory of at least one of said CPU and said DSPs; and
   assigning at least one of a persistence level attribute and a timer expiration attribute to said cached file, said persistence level attribute specifying how readily or not said cached file may be deleted from one or more of said cache memories in relation to a number of remaining cached files of other persistence levels.

11. The method as in claim 10, further comprising: assigning said persistence level of said cached file a value of "hard" denoting that said cached file is not to be removed from said cache memories, regardless of the number of remaining cached files of other persistence levels.

12. The method as in claim 10, further comprising: assigning said persistence level of said cached file a value of "hard" denoting that said cached file is a cached recording file, not to be removed from cache until said cached file is stored to a non-volatile storage medium, regardless of the number of remaining cached files of other persistence levels.

13. The method as in claim 10, further comprising: assigning said persistence level of said cached file a value of "none" denoting that said cached file is to be removed from said cache memories for any reason.

14. The method as in claim 13, further comprising: assigning said persistence level of said cached file a value of "soft" denoting that said cached file is to remain in said cache memories until after substantially all "none" cached files have been removed, said "soft" cached files being removed then by a Least Recently Used (LRU) algorithm.

15. The method as in claim 14, further comprising: assigning said persistence level of said cached file a value of "firm" denoting that said cached file is to remain in said cache memories until after substantially all "soft" cached files have been removed, said "firm" cached files also being removed then by an LRU algorithm.

16. The method as in claim 10, wherein said timer expiration attribute specifies a time period after which said cached file may be deleted from one or more of said cache memories.

17. The method as in claim 10, wherein said timer expiration attribute overrides said persistence level attribute.

18. The method as in claim 10, further comprising the step of: setting said timer expiration attribute and said persistence level attribute of said cached files on a per file basis.

19. A method for use in a converged services platform having a central processing unit (CPU) and a plurality of digital signal processors (DSPs), one of said DSPs being assigned for playback of a requested file, said method comprising the steps of:
   executing a caching algorithm for said requested file, said caching algorithm resulting in a cached file stored on a cache memory of at least one of said CPU and said DSPs;
   assigning at least one of a persistence level attribute and a timer expiration attribute to said cached file;
   determining whether or not said requested file is contained within a cache memory of said converged services platform;
   in response to a file not contained within a cache memory of said converged services platform:
      i) retrieving, at said CPU, said requested file from an associated file server;
      ii) caching said requested file in a cache memory of at least one of said CPU and said assigned playback DSP;
   in response to a file contained within said cache memory of said assigned playback DSP:
      i) performing a playback of said file from said cache memory of said assigned playback DSP; and
   in response to a file contained within said cache memory of said converged services platform, but not contained within said cache memory of said assigned playback DSP:
      i) caching said file to said cache memory of said assigned playback DSP contemporaneously with playback of said file from said cache memory of said converged services platform containing said file.

20. In a converged services platform, a media resources card comprising:
   a central processing unit (CPU);
   a plurality of digital signal processors (DSPs), one of said DSPs being assigned for playback of a requested file;
   means for executing a caching algorithm for said requested file, said caching algorithm resulting in a cached file stored on a cache memory of at least one of said CPU and said DSPs; and
   means for assigning at least one of a persistence level attribute and a timer expiration attribute to said cached file, said persistence level attribute specifying how readily or not said cached file may be deleted from one or more of said cache memories in relation to a number of remaining cached files of other persistence levels.

* * * * *